Aug. 14, 1951         P. J. MADDEX         2,564,337
PRODUCTION OF REFRACTORY METALS
Filed Nov. 2, 1948                        2 Sheets-Sheet 1

INVENTOR.
Phillip J. Maddex
BY C. B. Stevens
ATTORNEY.

Aug. 14, 1951  P. J. MADDEX  2,564,337
PRODUCTION OF REFRACTORY METALS
Filed Nov. 2, 1948  2 Sheets-Sheet 2

*INVENTOR.*
Phillip J. Maddex
BY
C. B. Stevens
*ATTORNEY.*

Patented Aug. 14, 1951

2,564,337

UNITED STATES PATENT OFFICE 2,564,337

PRODUCTION OF REFRACTORY METALS

Phillip J. Maddex, Columbus, Ohio, assignor, by mesne assignments, to Battelle Development Corporation, Columbus, Ohio, a corporation of Delaware Application November 2, 1948, Serial No. 57,923

6 Claims. (Cl. 266—11)

This invention pertains to the production of refractory metals such, for example, as titanium, zirconium, or the like, in quantities sufficient for large-scale commercial use. The method, and likewise the apparatus herein disclosed for illustrative purposes, is particularly adapted to the continuous production of such refractory metals in a form or condition capable of being rolled, machined, or otherwise used in the production of metallic objects.

Heretofore, it has generally been the practice to produce such refractory metals by introducing the reducing metal in the form of a pig into a confined space, melting the reducing metal, and maintaining the reducing metal at a temperature high enough to keep it molten, all in an inert atmosphere (argon or helium), and introducing a halide of the metal to be produced into the confined space, thus effecting the reduction of the halide to the refractory metal. The chloride of the reducing metal is formed as a by-product and is then drained off into the outside atmosphere. The produced refractory metal is collected in a container which is removed from the confined space only at the completion of the reaction, and at which point the produced metal has collected in a solid mass within the container. Consequently, this produced refractory metal, along with the residual reducing metal and the salt of such reducing metal, must be removed from the container by boring. Such procedure is limited to small-scale batch processes, and is impracticable for large-scale production, as well as having other disadvantages.

For example, in accomplishing the formation of refractory metal by such method, there is always the problem of removing the residual reducing metal or chloride of the reducing metal from the refractory metal produced. The preparation of such refractory metal by the reduction of a halide thereof with a reducing metal has depended upon the economical separation of the refractory metal from the unreacted reducing metal and the chloride of such reducing metal. The successful separation of the refractory metal from the reducing metal and a salt thereof has had to be carried out in a way which would avoid contamination of the refractory metal with impurities such as oxygen or nitrogen and, therefore, by some means whereby precise control of the atmosphere could be maintained. In the past, the separation of the reducing metal or the reducing metal chloride remaining with the formed refractory metal has been effected by one of two methods, namely, by vacuum distillation at elevated temperatures, or by grinding the reaction product and leaching the reducing metal and reducing metal chloride from the formed refractory metal.

The removal of the reducing metal chloride by vacuum distillation is necessarily slow because a high vacuum, in the order of 0.1 to 0.01 microns, must be maintained to secure complete removal of the reducing metal and the metal chloride. At the same time, the vacuum must be sufficiently low to guard against contamination of the refractory metal with oxygen or nitrogen. Furthermore, the refractory metal sponge must be cooled in a vacuum to room temperature because such refractory metal retains a propensity for oxygen and nitrogen absorption at temperatures as low as 700° F. and possibly as low as 100° F.

Where a leaching process is used, it is necessary to grind the sponge formed by the refractory metal in crystalline form to a fairly fine state of division. This means that a substantially ductile metal must be ground, and such grinding must be carried out so that the refractory metal is not heated appreciably above room temperature. After the grinding has been accomplished, it is necessary to dissolve the chloride and the residual metal to remove it from the refractory metal. For efficient leaching, it is necessary to prevent, insofar as is practical, the hydrolysis of the salt of the reducing metal. Furthermore, the marked tendency of the refractory metal to absorb oxygen and nitrogen at any temperature above 30° C. makes it necessary to remove all of the heat of solution formed by the reaction of the reducing metal chloride with water and the reducing metal with hydrochloric acid. After the refractory metal has been leached, the fine refractory metal must be dried and this must be done at a low temperature to avoid the absorption of oxygen and nitrogen.

The currently used methods of producing refractory metal are obviously impractical for large-scale production. Likewise, the currently used methods of separating refractory metal from the reducing metal and reducing metal chloride are not only expensive but are such that some harmful contamination of the refractory metal is likely to occur. The present invention overcomes these disadvantages and, at the same time, provides a continuous system for producing a refractory metal ingot cheaply and on a large scale.

For illustrative purposes only, the invention will be hereinafter explained as applied to the production of titanium metal by the reaction of a halide of titanium with molten magnesium as the reducing metal, it being understood that refractory metals having like or similar characteristics to titanium metal may be produced, and that reducing metals other than magnesium which are adaptable to the purpose, such as potassium, sodium, or calcium, may be used.

In accordance with this disclosure, a reaction chamber is provided, together with means for effecting and maintaining temperatures within the reaction chamber suitable for performance of the process. Means are provided for maintaining a suitable atmosphere within the reaction chamber, and this atmosphere may be either a halide of the refractory metal of the group consisting of titanium and zirconium, in a vapor state, or a combination of such halide and an inert atmosphere such as argon or helium. Means are also provided for supplying to the reaction chamber a reducing metal in such condition and in such quantity that there will be substantially complete reaction between the introduced reducing metal and the refractory metal halide to produce the refractory metal and a salt of the reducing metal. In addition, means are provided for removing the produced refractory metal from the reaction chamber continuously and delivering such produced refractory metal to a point where it may be collected and further treated for use. Such refractory metal is removed in substantially loose crystalline form and before coalescence of the crystals and solidification with the magnesium chloride into a solid mass.

As the refractory metal is removed from the reaction chamber, it is first delivered to a drainage screen, which is preferably vibrated and which permits removal of excess reducing metal chloride from the produced refractory metal. From such screen, the refractory metal moves to a conveying element and into a collecting chamber. From such collecting chamber the refractory metal is moved by another conveyer into an apparatus of such nature that the refractory metal will be reduced to ingot form while any residual reducing metal or reducing metal chloride will be simultaneously removed therefrom. From the point at which the refractory metal is delivered from the reaction chamber to that point in the apparatus where the refractory metal is reduced to ingot form, such refractory metal is maintained under an inert atmosphere (argon or helium), and has no access to oxygen or nitrogen, and the refractroy metal is thus maintained in a substantially pure condition and without contamination.

Various objects and advantageous features of this invention will be apparent from the following description when taken in conjunction with the accompanying drawings wherein similar characters of reference designate corresponding parts, and wherein:

Figure 3 is a sectional view of the reaction chamber looking to the right in Figure 1 along the line a—a.

Figure 1:
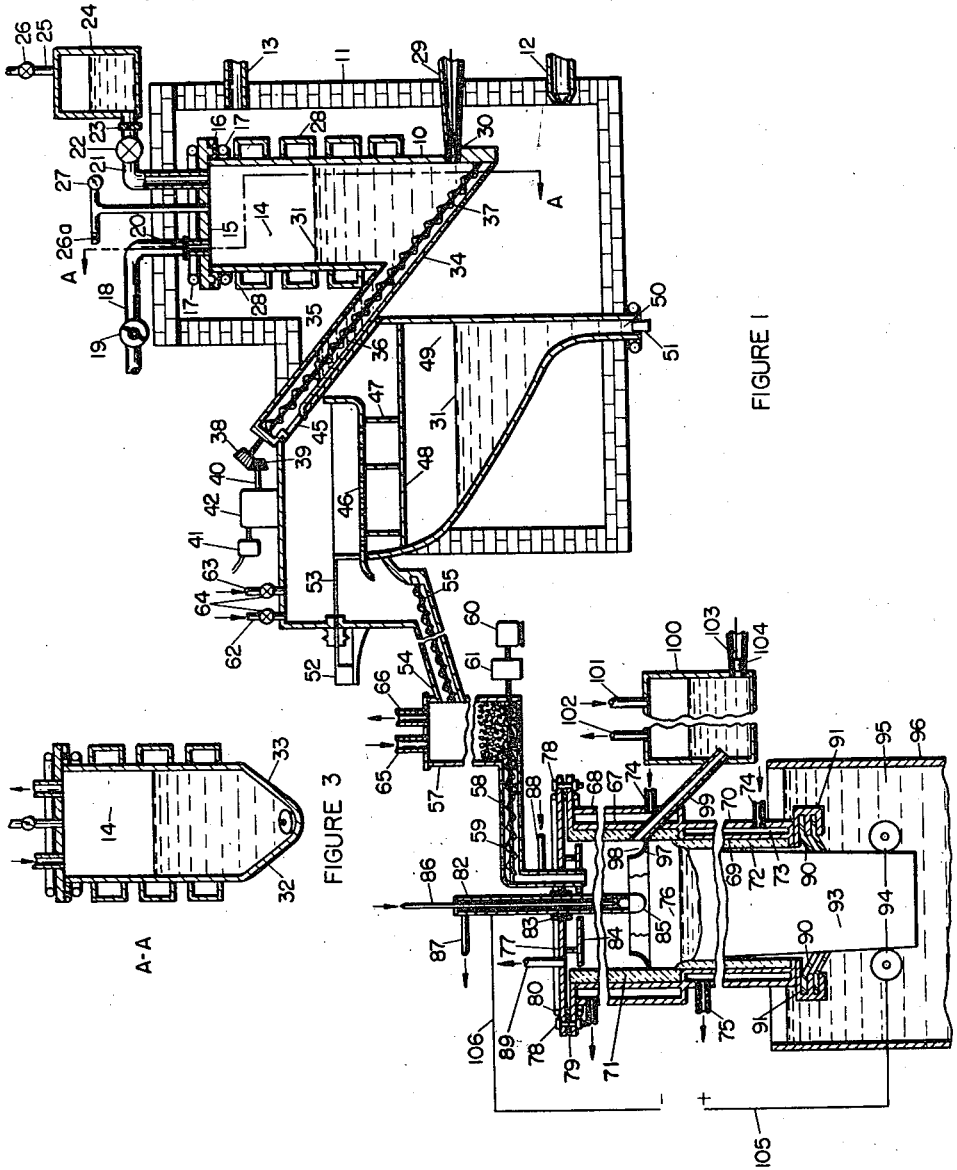
Figure 1 is a view, partly in elevation and partly in section, showing one form of apparatus for accomplishing this invention.

Referring to the drawings, the apparatus shown for illustrative purposes comprises a container 10 of steel or other suitable material which may be suitably supported in a furnace or other type of heating unit 11. The furnace shown has an inlet 12 for supplying combustibles to the furnace, and a vent 13 through which the products of combustion pass out of the furnace. A chamber 14 within the container 10 is closed at its top by a cap 15 which rests on a gasket 16, and which cap may be secured to the top of the container 10 in any well known manner. The gasket 16 is cooled by passing water or other cooling media through conduits 17 disposed on either side of the gasket. Extending through the cap 15 and leading to the chamber 14 of the container 10 is a conduit 18 in which is disposed a pump 19, and intermediate the pump 19 and the opening from the insulated conduit 18 to the chamber 14 is an orifice 20, the purpose of which will be hereinafter apparent.

Also extending through the cap 15 and leading to the chamber 14 of the container 10 is a conduit 21 under the control of an electrically operated drive 22, diagrammatically shown, and an orifice 23. Such conduit 21 leads from a container 24 which may be maintained under pressure by way of a conduit 25 and a pressure regulator 26. The chamber 14 of the container 10 is likewise equipped with a pressure relief valve 26a and a pressure indicator 27. Jackets 28 for the circulation of cooling media are disposed around the exterior of the container 10. An outlet 29, under control of a valve 30, is provided near the bottom of the container 10 for withdrawing a liquid salt of the reducing metal formed by the reaction hereinafter described.

In the operation of this apparatus for the production of titanium, let it be assumed that the chamber 14 is empty, the valve 22 is closed, and the pump 19 for producing a flow of molten magnesium metal through the orifice 20 into the chamber 14 is not in operation. Then the chamber 14 is heated to bring the interior thereof to a temperature of, say, 200° C. to 300° C. and a halide of titanium tetrachloride is introduced into the chamber through the conduit 21. Such titanium chloride from the container 24 flows through the orifice 23 and past the valve 22 under pressure, and upon reaching the interior of the chamber 14 vaporizes under the influence of heat and produces a pressure within the chamber of any desirable amount, say from 1 to 5 pounds. Such pressure of the titanium tetrachloride causes opening of the relief valve 26a and a purging of the air from the chamber 14, and results in the chamber 14 being filled with an atmosphere of titanium tetrachloride.

After the chamber 14 has been purged of air and filled with an atmosphere of titanium tetrachloride, the temperature of the chamber is raised to from 750° C. to 900° C. which is the temperature at which the reducing metal will react with the titanium tetrachloride to form titanium metal and a chloride of the reducing metal. Then, the pump 19 is placed in operation to deliver molten magnesium from a source of supply (not shown) through the orifice 20 into the chamber 14. The flow of reducing metal is so regulated that substantially complete reaction of this metal and the refractory metal halide vapor is effected to produce titanium metal and magnesium chloride in the chamber 14. The titanium metal, which is in the form of primary crystals, and more or less spongy, falls to the bottom of the chamber 14, in which is likewise collected the salt of the reducing metal (magnesium chloride) 31.

Sufficient exothermic heat is derived from the reaction between the titanium tetrachloride and the molten magnesium metal to permit the closing down of the furnace 11 after reaction between the reducing metal and the halide of the refractory metal has proceeded for a given time. A cooling medium such as air may be flowed through the cooling jackets 28 to maintain the temperature in the chamber 14 at, or somewhat above, the reaction temperature necessary for the reaction between the magnesium metal and the titanium tetrachloride, but sufficiently low to prevent an excess of pressure being built up within the container 10, as well as to prevent excessive vaporization of the magnesium. Of course, should there be excess pressure, such pressure will be relieved through the relief valve 26a. Titanium tetrachloride is introduced through the conduit 21 at a rate controlled by the pressure within the chamber 14 by means of well-known pressure transmitting mechanisms whereby there will be at all times a positive pressure of titanium tetrachloride within the chamber 14, so as to maintain the interior of the container free of air. Reducing metal is supplied to the chamber 14 through the orifice 20 under a pressure slightly greater than the pressure in the chamber 14.

The process hereinbefore described is continued with the magnesium metal and titanium tetrachloride reacting within the chamber 14 to produce titanium metal, which metal falls to the bottom of the chamber 14, and magnesium chloride which is collected in the lower part of the chamber 14. Such magnesium chloride may be drawn off from time to time through the passageway 29 under the control of the valve 30 for transfer to a suitable container, or otherwise conserved for the production of further magnesium metal.

As shown in Figure 3, the bottom of the compartment 14 angles inwardly on opposite sides as at 32 and 33. Referring to Figure 1, the bottom of the compartment 14 is angled upwardly, as at 34, as is also one side wall of the container 10 as at 35, these upwardly angling portions forming a conduit 36 which terminates above the level of the magnesium chloride 31 in the compartment 14. Disposed around the bottom of the compartment 14 and extending through the upwardly angling conduit 36 is a conveying screw 37 which is supported in suitable bearings and is driven by co-acting bevel gears 38 and 39, one of which is mounted on the shaft supporting the conveyer screw 37 and the other of which is supported on the shaft 40 driven by a suitable electric motor 41 through a suitable reduction gearing 42.

The titanium metal, as it is produced in the compartment 14 and moves to the bottom thereof, is moved upwardly and out of the compartment by the screw conveyer 37 to drop out of the conduit 36 through the opening 45 provided for that purpose. The end of the screw conveyer 37, being above the level of magnesium chloride 31 in the compartment 14, seals the compartment 14 against entrance of air through the conduit 36. On falling out of the opening 45, the titanium metal falls upon a foraminous member 46 carried by flexible supports 47 on a member 48. Liquid magnesium chloride adhering to the titanium metal drains off through the foraminous member 46 and into a receiver 49 mounted in the furnace 11, and is collected there for removal through a drain opering 50 under the control of a plug valve 51. Since the container 49 is disposed in the furnace 11, the heat from such furnace will maintain the magnesium chloride in liquid condition.

The foraminous member 46 is vibrated by a suitable vibrator 52 connected to a shaft 53 which is, in turn, connected to the member 46. Titanium metal deposited upon the foraminous member 46 from the opening 45 is shaken off the member by vibration thereof and into a conduit 54 which contains a suitably driven screw conveyer 55. The titanium metal is moved through the conduit 55 by the screw conveyer into a receiving compartment 57, and from such compartment 57 is delivered to a unit in which the metal is reduced in ingot form and any residual magnesium metal or magnesium chloride is removed therefrom. Delivery of the titanium metal from the receiving compartment 57 to such unit is accomplished by a screw conveyer 58 operating in a conduit 59 and driven by a motor 60 through a suitable reduction gearing 61.

The walls of the container 49 and the walls surrounding the foraminous member 46 and the end of the screw conveyor 37, as well as the screw conveyer 55, are substantially continuous and provide a container which does not have access to the atmosphere. At the top of such container there is provided an inlet conduit 62 and an outlet conduit 63 under the control of valves 64. These inlet and outlet conduits provide a means for introducing an inert gas, such as argon or helium, into the container, and for the escape of air originally in the container whereby an atmosphere of inert gas may be maintained continuously throughout the container. The receiving compartment 57 is likewise provided with an inlet conduit 65 and an outlet conduit 66 so that this container may likewise contain an atmosphere of argon or helium to the exclusion of air.

It will be understood that the particular part of the apparatus for forming the titanium metal from the reaction between a halide thereof and a reducing metal may be varied. For example, the reducing metal may be introduced into the reaction chamber otherwise than from the top thereof, for example, from a point below the level of the magnesium chloride 31. Likewise, the titanium metal may be produced in a cell in which the magnesium metal is produced by electrolytic action on magnesium chloride. Further, the titanium metal may be produced by the utilization of an inert gas in which the reaction between the reducing metal and the halide of the refractory metal takes place, or the reaction may be wholly completed in an atmosphere of the halide of the refractory metal.

Figure 2:
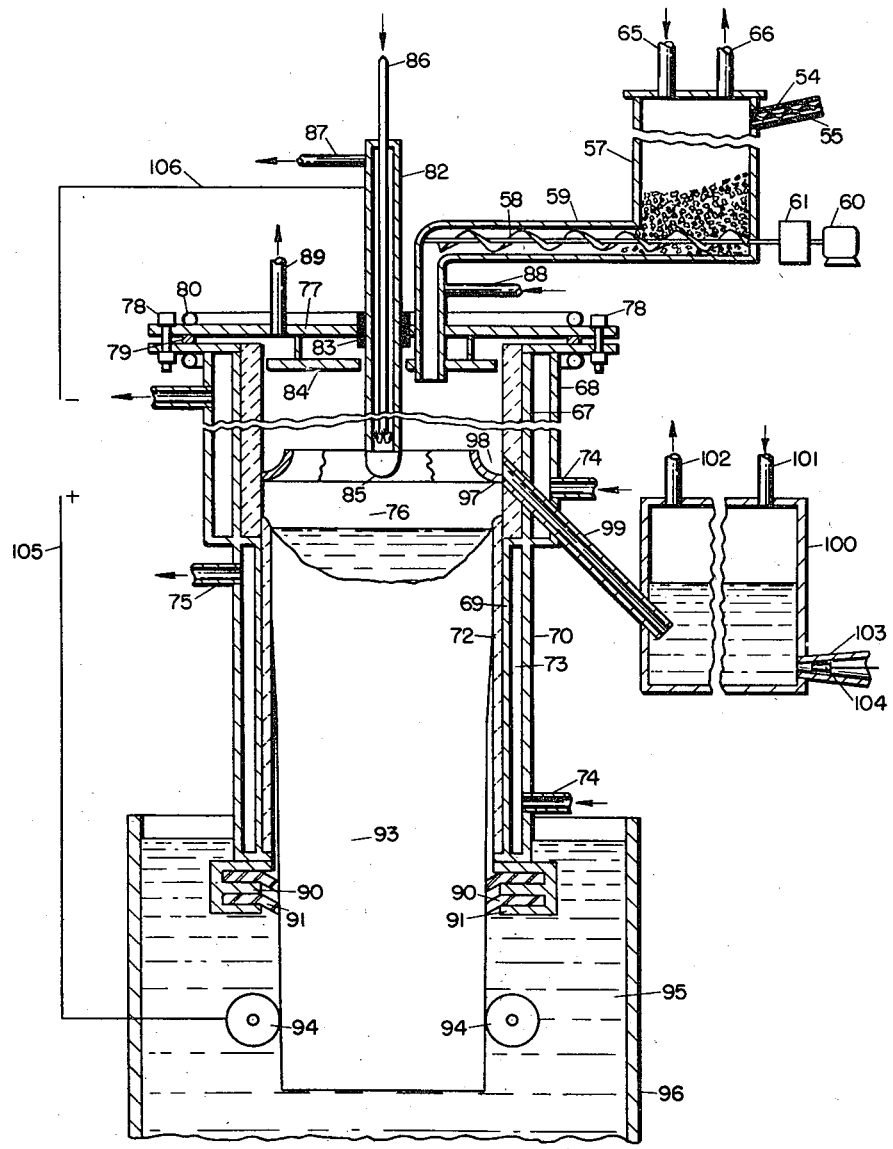
Figure 2 is a view, partly in elevation and partly in section, showing that part of the apparatus provided for reducing the refractory metal to ingot form and simultaneously removing from such refractory metal any residual reducing metal or reducing metal chloride.

Referring to Figures 1 and 2, the unit for reducing the crystalline titanium metal to ingot form and simultaneously removing from such titanium metal any residual magnesium metal or magnesium chloride takes the form of a melting furnace having a continuous chamber made up of spaced walls 67 and 68 at its uppermost end and spaced walls 69 and 70 at its lower portion. The pairs of walls 67—68 and 69—70 are slightly offset from each other to provide for an internal lining of carbon or other refractory materials 71 in the uppermost end of the container which is relatively thick and for an internal lining 72 at the bottom of the container which is relatively thin. Each pair of walls 67—68 and 69—70 provide a reservoir 73, and each reservoir has an inlet 74 and an outlet 75 for the circulation of water or other cooling media through the respective reservoirs. Any suitable media may be used for circulating the water or other cooling media through the reservoirs. The inner walls 67, 69 are preferably of a material having a high heat conductivity and a relatively high melting point, and the outer walls 68, 70 may be of any suitable material which will provide a wall for a liquid reservoir.

The tubular chamber 76 is closed at its top by a plate 77 secured to the top of the chamber by bolts 78 and separated from the top of the uppermost reservoir by a gasket 79, which is cooled by means of suitable cooling media circulating pipes 80. Such cap 77 has a central opening 81 through which an electrode 82 extends downwardly into the chamber 76. The electrode is rotatable and also movable in the direction of its length in the opening 81 and through a sealing and electrical insulating ring 83. The conduit 59 likewise extends downwardly through the cap 77 into the chamber 76 for delivery of the crystalline titanium metal thereto. Carried by the underside of the cap 77 and in spaced relation thereto is a radiation shield 84 which assists in maintaining the cap cool and protects the sealing and electrical insulating ring 83.

The electrode 82 consists of a hollow stem of, for example, steel having brazed to the free end thereof a welding tip 85 of some high melting point material, for example, tungsten. Leading into the upper end of the hollow stem of the electrode 82 and extending substantially throughout the length of the stem to a point adjacent the tip 85 is a water inlet pipe 86 through which water may be introduced into the interior of the electrode stem and be discharged on the upper surface of the tip 85. A water outlet 87 is provided at the top of the electrode stem whereby the water introduced into the stem adjacent the bottom thereof will flow along the walls of the stem in its passage outwardly and cool the stem.

The heat generated in the tip of the resistance and heat of the arc is obviously high, and in order to have a permanent rather than a consumable tip, the length and diameter of the tip have such relation to the area of the top side of the tip which is contacted by the water flowing through the pipe in the stem of the electrode that the amount of heat dissipated from the tip with respect to the heat input will be in substantial equilibrium within a range of temperatures, the highest of which is less than the melting point of the tip. Such equilibrium is likewise controlled by the temperature of the water and the rate of flow and impingement of the water on the upper surface of the tip. It follows that the tips may be of varying size, but that there should be such relation between the size of the tip, the area of the tip on which the cold water impinges, the rate of flow of the water, and the temperature of the water, that the equilibrium hereinbefore set forth will be maintained.

It is preferable that the melting of the crystalline titanium metal take place in an atmosphere of inert gas such, for example, as argon or helium, and such inert gases are introduced into the container 76 by suitable conduits 88 and 89 and, if desired, a slight pressure of inert gas may be maintained in the container.

The apparatus is shown as being arranged for the continuous production of a casting or ingot. The lowermost end of the container is unrestricted except for annular flexible rings 90 of suitable material so arranged as to engage the outer circumference of the ingot. Such flexible rings are held in a metal housing 91 secured to the lowermost end of the container. The inside diameters of the rings 90 are less than the diameter of the ingot or casting 93 whereby the rings will engage the ingot tightly, as shown, and permit an atmosphere of inert gas to be maintained in the upper part of the container.

Rollers 94, which may be hand or power driven, are provided for guiding the ingot or casting 93 downwardly into a bath of liquid such as oil or water 95 in a tank 96, and suitable cut off means may be provided for cutting the ingot or casting 93 into suitable lengths. There should be such distance between the point of melting of the crystalline titanium metal and the point on the ingot engaged by the sealing rings 90 that the ingot may cool sufficiently so as not to adhere to the sealing rings 90, or the sealing rings themselves may be of such material as not to adhere to the outer circumference of the ingot.

Positioned in the upper part of the container and spaced from the point of melting of the crystalline titanium metal is an annular ring 97 cooperating with the refractory lining of the upper part of the container to form a channel 98. Leading from this channel 98 to the outside of the melting unit is a conduit 99 which leads into a container 100 at a point substantially adjacent the bottom of such container. An inlet conduit 101 and an outlet conduit 102 are provided for the container 100 in order to maintain an inert atmosphere of, for example, argon or helium therein, and a drainage conduit 103 under the control of a valve 104 is provided in the bottom of such container 100.

In utilizing this apparatus to melt high refractory metals of the type herein mentioned for the purpose of producing ingots or castings, a plug, preferably of titanium metal, or at least a part of ingot 93 is disposed in the melting unit to form the bottom of the chamber 76 and act with the electrode 82 as one of a pair of counter electrodes through which current may flow from the lines 105 and 106. Line 105 is connected to a roller 94 and line 106 is connected to the electrode 82. The space in the container above the blank or ingot is first purged of air and filled with an inert atmosphere by introducing inert gas through the inlet pipe 88 and forcing the air out of the outlet pipe 89. By continuous flow of gas through the inlet and the outlet 89, any desired pressure of inert gas may be maintained in the upper end of the compartment. Water or other cooling media is then introduced and circulated through the reservoir 73 formed by the walls 67—68 and 69—70 to provide walls in the upper end of the container which are above the melting point of magnesium and magnesium chloride and walls in the lower portion of the container which are of such temperatures as not to react or alloy with the titanium, the temperature of such latter walls being so regulated that the rate of cooling of the melted titanium will be sufficient to permit the desired rate of ingot removal. Water or other cooling media is likewise introduced and caused to flow through the electrode 82 to cool the electrode beyond the tip 85 and to maintain the tip itself at less than melting temperatures of the metal forming the tip whereby it is possible to have other than a consumable electrode.

These steps having been accomplished and the electric circuit energized, the electrode 82 is moved toward the plug or part ingot 93 to bring the tip 85 into such relation with the top of the ingot that a proper arc will be formed with the ingot 93 and the electrode 82 each acting as one of a pair of counter electrodes. It is preferable to use a D. C. straight polarity current and thus keep the side represented by the electrode 85 coolest since keeping such side coolest is desirable in the utilization of a permanent electrode and there is less likelihood of the temperature being such as to melt the tip.

Arcing between the electrodes results in a pool of liquid titanium metal at the top of the ingot. Spongy titanium in crystalline form is fed from the container 57 by the screw conveyer 58 at a rate dependent upon the rate of melting to be accomplished and the size of the ingot to be produced, as well as other factors. As the ingot 93 is built up by the melting of the spongy titanium metal the ingot 93 is moved downwardly by the rollers 94 at such a rate as to maintain the proper distance between the upper end of ingot and the electrode and thus maintain the proper arc. The melted titanium metal, as it cools, tends to shrink away from the refractory lining 72 in substantially the manner illustrated whereby the downward movement of the ingot is comparatively unrestricted except for the rollers 94.

As the spongy titanium metal is dropped into the arced area, the temperature of the arc which is about 3000° C. causes the magnesium and the magnesium chloride to boil and rise in the upper part of the compartment as a mist. When such mist reaches the upper area of the chamber it tends to migrate toward the refractory walls 71 which, as hereinbefore stated, are maintained at a temperature of about 1300° F. On striking the walls, such mist wets the walls and flows downwardly along the walls as a liquid into the collecting ring 97 from which it drains through the conduit 99 into the container 100. Since the temperature of the wall 71 is above the melting temperature of magnesium and magnesium chloride, any solid particles contained in the mist will, on striking the wall, melt and run down as liquid into the retaining ring.

At least a part of the mist of magnesium chloride and magnesium rising from the arc area will be carried out of the upper part of the melting chamber by the flowing inert gas that flows through the conduit 88 into the chamber and thence out of the conduit 89, and may be collected if desired by flowing the outgoing inert gas and the entrained magnesium and magnesium chloride through proper apparatus. In some instances, and under some conditions, all of the mist may be so removed. Also, if desired, the outgoing inert gas and the entrained magnesium and magnesium chloride may be flowed through a closed circuit wherein the entrained magnesium and magnesium chloride are removed from the inert gas and such gas then recirculated through the top of the melting chamber.

With the invention herein disclosed there is provided a method and apparatus for producing refractory metals such, for example, as titanium, zirconium or the like, continuously and in quantities sufficient for large-scale commercial use. Castings or ingots of comparatively large volume and diameter may be produced and the electrodes may be utilized singly or in multiple as is desired. Other advantageous features of this invention which will be apparent such, for example, as the continuous production of titanium metal in usable form without the heretofore time consuming and expensive steps necessary for the removal of residual alkali reducing metal and alkali reducing metal chloride from the metal.

What is claimed is:

1. Apparatus for producing ingots or castings of the refractory metals titanium and zirconium produced by reaction between a reducing metal and a halide of the refractory metal to form the refractory metal and a salt of the reducing metal, and which ingots or castings are free from residual reducing metal and reducing metal salt, and which metals in their precast state are absorbtive of oxygen and nitrogen, which comprises the combination of a reaction chamber for producing the refractory metal, a melting chamber for melting the refractory metal, and a device for transferring the produced refractory metal from the reaction chamber to the melting chamber, an external heating means for supplying heat to said reaction chamber, an inlet to said reaction chamber through which an alkali or alkaline earth reducing metal of the group consisting of magnesium, sodium, potassium and calcium is supplied to said chamber, an inlet to said reaction chamber through which a halide of the refractory metal to be produced is supplied to said reaction chamber for reaction with the alkali or alkaline earth metal to produce the refractory metal in crystalline form and a salt of the reducing metal, said transfer device including a conveyor effective to collect the produced refractory metal from adjacent the bottom of said reaction chamber and transfer such crystalline refractory metal to the melting chamber, a separator within the length of the conveyor for separating excess reducing metal and reducing metal salt from the crystalline refractory metal while said refractory metal is being transferred from said reaction chamber to said melting chamber, a casing surrounding said transfer device, an inlet to said casing and an outlet therefrom by means of which the said casing is maintained filled with a protective gas to the exclusion of air, said melting chamber having an inlet through which refractory metal transferred thereto by said conveyor is supplied to the interior of said melting chamber, an inlet to said melting chamber for supplying a protective gas to and excluding air from said chamber, means for heating the refractory metal supplied to said chamber to a degree to render the same molten and to cause any residual reducing metal and reducing metal salt to rise therefrom as a mist, collecting means in said chamber for collecting the residual reducing metal and reducing metal salt and carrying them out of said chamber, and cooling means associated with said chamber for cooling the molten refractory metal to ingot or casting form.

2. Apparatus for producing ingots or castings of the refractory metals titanium and zirconium produced by reaction between a reducing metal and a halide of the refractory metal to form the refractory metal and a salt of the reducing metal, and which ingots or castings are free from residual reducing metal and reducing metal salt, and which metals in their precast state are absorbtive of oxygen and nitrogen, which comprises the combination of a reaction chamber for producing the refractory metal, a melting chamber for melting the refractory metal, and a device for transferring the produced refractory metal from the reaction chamber to the melting chamber, an external heating means for supplying heat to said reaction chamber, an inlet to said reaction chamber through which an alkali or alkaline earth reducing metal of the group consisting of magnesium, sodium, potassium and calcium is supplied to said chamber, an inlet to said reaction chamber through which a halide of the refractory metal to be produced is supplied to said reaction chamber for reaction with the alkali or alkaline earth metal to produce the refractory metal in crystalline form and a salt of the reducing metal, said transfer device including a conveyor effective to collect the produced refractory metal from adjacent the bottom of said reaction chamber and transfer such crystalline refractory metal to the melting chamber, a separator within the length of the conveyor for separating excess reducing metal and reducing metal salt from the crystalline refractory metal while said refractory metal is being transferred from said reaction chamber to said melting chamber, a casing surrounding said transfer device, an inlet to said casing and an outlet therefrom by means of which the said casing is maintained filled with a protective gas to the exclusion of air, said melting chamber having an inlet through which refractory metal transferred thereto by said conveyor is supplied to the interior of said melting chamber, an inlet to said melting chamber for supplying a protective gas to and excluding air from said chamber, means for heating the refractory metal supplied to said chamber to a degree to render the same molten and to cause any residual reducing metal and reducing metal salt to rise therefrom as a mist, collecting means in said chamber for collecting the residual reducing metal and reducing metal salt and carrying them out of said chamber, said collecting means including a condenser for the mist and a collecting trough on the condenser for gathering the condensed mist, and cooling means associated with said chamber for cooling the molten refractory metal to ingot or casting form.

3. Apparatus for producing ingots or castings of the refractory metals titanium and zirconium produced by reaction between a reducing metal and a halide of the refractory metal to form the refractory metal and a salt of the reducing metal, and which ingots or castings are free from residual reducing metal and reducing metal salt, and which metals in their precast state are absorbtive of oxygen and nitrogen, which comprises the combination of a reaction chamber for producing the refractory metal, a melting chamber for melting the refractory metal, and a device for transferring the produced refractory metal from the reaction chamber to the melting chamber, an external heating means for supplying heat to said reaction chamber, an inlet to said reaction chamber through which an alkali or alkaline earth reducing metal of the group consisting of magnesium, sodium, potassium and calcium is supplied to said chamber, an inlet to said reaction chamber through which a halide of the refractory metal to be produced is supplied to said reaction chamber for reaction with the alkali or alkaline earth metal to produce the refractory metal in crystalline form and a salt of the reducing metal, said transfer device including a conveyor effective to collect the produce refractory metal from adjacent the bottom of said reaction chamber and transfer such crystalline refractory metal to the melting chamber, a separator within the length of the conveyor for separating excess reducing metal and reducing metal salt from the crystalline refractory metal while said refractory metal is being transferred from said reaction chamber to said melting chamber, a casing surrounding said transfer device, an inlet to said casing and an outlet therefrom by means of which the said casing is maintained filled with a protective gas to the exclusion of air, said melting chamber having an inlet through which refractory metal transferred thereto by said conveyor is supplied to the interior of said melting chamber, an inlet to said melting chamber for supplying a protective gas to and excluding air from said chamber, a heater for the refractory metal supplied to said chamber effective to heat the refractory metal to a degree to render the same molten and to cause any residual reducing metal and reducing metal salt to rise therefrom as a mist, the mist of reducing metal and reducing metal salt being carried, at least in part, from the melting chamber by circulation of inert gas through said chamber, a collector in said chamber for collecting the residual reducing metal and reducing metal salt and carrying them out of said chamber, and cooling means associated with said chamber for cooling the molten refractory metal to ingot or casting form.

4. Apparatus for producing ingots or castings of substantially pure refractory metals of the group including titanium and zirconium which comprises the combination of a reaction chamber, a transfer apparatus and a casting chamber, said reaction chamber having pump means connected to said chamber to introduce molten magnesium from a source, means connected to said chamber to introduce a halide of titanium on to the molten magnesium, a first screw conveyor means having the intake end mounted in the bottom of the reaction chamber and having the exhaust end of the screw above the level of the contents of the reaction chamber, a foraminous separator mounted directly under the exhaust end of the first conveyor, means for vibrating the separator, said chamber, conveyor and separator being mounted in a furnace to maintain the magnesium and the magnesium chloride, formed by the reaction, molten, an accumulator mounted on the melting chamber, a second conveyor mounted at the exhaust end of the separator to transport solid material from the separator to said accumulator, the first conveyor, the separator, the second conveyor, the accumulator and the melting chamber being surrounded by a cover, relief valve means mounted in the top of the reaction chamber to purge the chamber of contaminant gases, means for supplying an oxygen- and nitrogen-free protective gas into said cover, means for charging the melting chamber with material from the accumulator, means for heating the upper part of the melting chamber to melt the titanium metal and to evaporate any contaminating by-products conveyed to the melting chamber from the reaction chamber, a condenser mounted in the upper part of the melting chamber and means to remove the condensed by-products, from the by-products condenser and means surrounding the melting chamber to cool the molten titanium metal to an ingot or casting.

5. Apparatus for producing ingots or castings of the refractory metals titanium and zirconium produced by reaction between a reducing metal and a halide of the refractory metal to be produced to form the refractory metal and a salt of the reducing metal, and which ingots or castings are free from residual reducing metal and reducing metal salt, which comprises a melting chamber, an inlet to said chamber through which the refractory metal is introduced into said chamber, an inlet to and an outlet from said chamber through which an inert gas is circulated through said chamber under pressure to purge the air from said chamber and maintain an inert atmosphere therein, a heater for said chamber for applying heat to said refractory metal to temperatures sufficiently high to reduce the refractory metal to molten condition and any residual reducing metal and reducing metal salt associated with the refractory metal to a vapor mist, a collecting device for said vapor mist associated with said melting chamber, said collecting device including a condenser and a collecting trough on the condenser for gathering the condensed vapor mist, and means for cooling the molten refractory metal to ingot or casting form.

6. A continuous production furnace for the purification and casting of granular metals, having side walls, a top closure and a container surrounding the lower end of the side walls, said side walls being formed by an axially aligned first and second pair of separated walls, said separated walls being closed at each end and forming a coolant passageway, said second pair of walls being below and offset inwardly from said first pair of walls to form a shoulder, a refractory liner mounted on said shoulder forming a continuous coating for the inner wall of said first pair of walls, a separate refractory liner continuously covering the inner wall of the second pair of walls, said side walls extending into said container forming a continuous chamber open at the bottom, a coolant means in said container closing the lower end of said continuous chamber, means attached to the outside of said separated walls to supply coolant to each of said coolant passageways, a gasket between said top closure and the top of said first pair of walls, cooling means mounted above and below said gasket, an anode mounted in the top closure, said anode being insulated from the closure, vertically adjustable and water cooled, a material supply conduit mounted in said top closure, a collecting trough mounted on the inside of the upper refractory liner, a drain conduit opening into said trough and terminating outside the furnace, a reservoir trap closing the end of said drain conduit, guide means in said container to guide a continuous ingot formed in said continuous chamber, an electric connection to said guide means which touch the ingot formed in the chamber and thereby completes the heating circuit.

PHILLIP J. MADDEX.

REFERENCES CITED

The following references are of record in the file of this patent:

UNITED STATES PATENTS

| Number | Name | Date |
|---|---|---|
| 2,121,084 | Kruh | June 21, 1938 |
| 2,205,854 | Kroll | June 25, 1940 |
| 2,251,906 | Hanawalt | Aug. 12, 1941 |
| 2,369,233 | Hopkins | Feb. 13, 1945 |
| 2,445,670 | Hopkins | July 20, 1948 |
| 2,482,127 | Schlechten et al. | Sept. 20, 1949 |

OTHER REFERENCES

Metal Industry, October 18, 1946, pages 319–322, inclusive.

---

Certificate of Correction

Patent No. 2,564,337                    August 14, 1951

PHILLIP J. MADDEX

It is hereby certified that error appears in the printed specification of the above numbered patent requiring correction as follows:

Column 11, line 65, for "produce" read *produced*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*